Aug. 31, 1965    C. D. FLANAGAN    3,203,166
THERMOSTATIC ELEMENTS
Filed Sept. 8, 1961
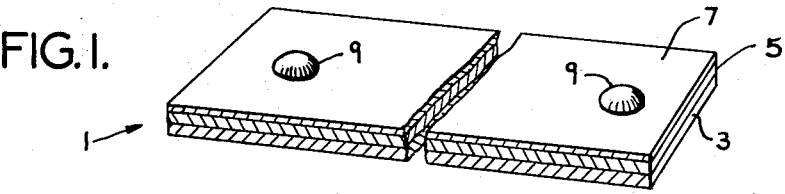
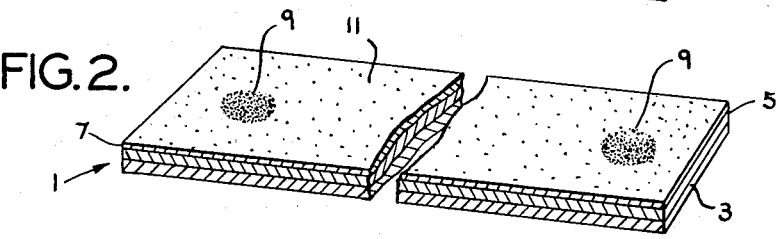
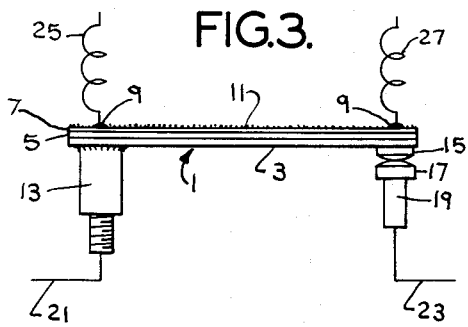
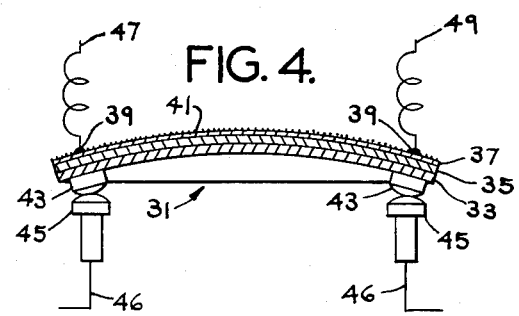
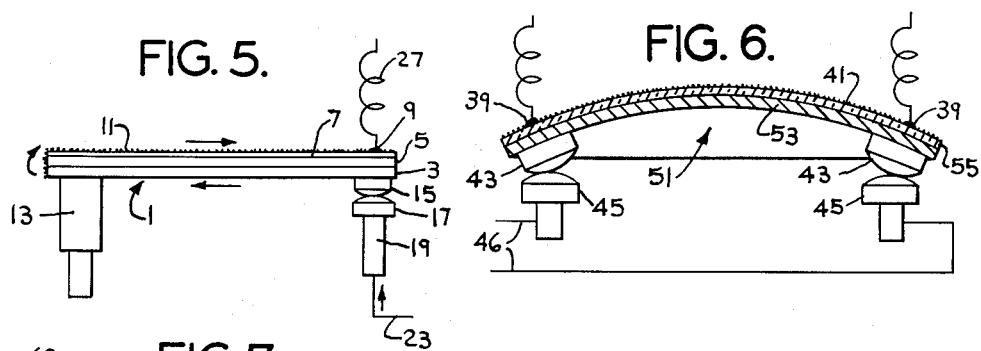
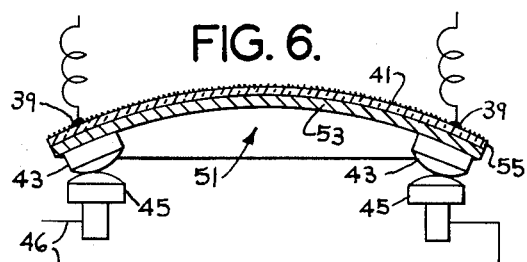
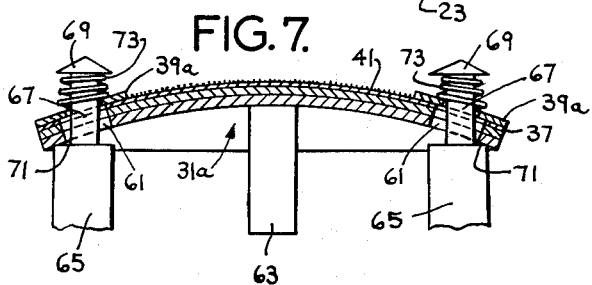
Charles D. Flanagan,
Inventor.
Koenig, Pope, Senniger and Powers,
Attorneys.

United States Patent Office
3,203,166
Patented Aug. 31, 1965

3,203,166
THERMOSTATIC ELEMENTS
Charles D. Flanagan, Attleboro, Mass., assignor to Texas Instruments Incorporated, Dallas, Tex., a corporation of Delaware
Filed Sept. 8, 1961, Ser. No. 136,956
8 Claims. (Cl. 60—23)

This application is a continuation-in-part of my copending application Serial No. 693,131, filed October 29, 1957, for Thermostats issued as U.S. Patent 3,002,386, October 3, 1961.

This invention relates to thermostatic elements, and more particularly to thermostatic elements such as are used in thermal relays, motor protectors, thermostats and the like where the elements are to be heated in response to rise of electric current.

Thermostatic elements such as are used in thermal relays, motor protectors and other electrical thermostat devices are conventionally heated either by passing an electric current directly through the element (thus utilizing the element itself as its own electrical resistance heater), or by providing an entirely separate electrical resistance heater adjacent the element and passing current through this separate heater. While with the first arrangement, assembly of the device is simplified because there is no separate heater, physical requirements as regards the dimensions and constituent metals of the element may be inconsistent with a requirement for high electric resistance. While with the second arrangement, it is possible to provide a high resistance heater, assembly is complicated by reason of the plurality of parts involved and heat exchange efficiency is reduced because of the necessity for spacing the heater from the element.

Accordingly, among the several objects of this invention may be noted the provision of a unitary thermostatic element and electrical resistance heater wherein the heater is carried directly by the thermostatic element rather than being a separate part, and as to which the thermostatic element may be either of the slow-acting or snap-acting type, and the heater may be a high resistance heater; and the provision of a unitary thermostatic element and electrical resistance heater such as described wherein the construction is such as to obtain a very high rate of rise of temperature of the thermostatic element for a given rate of rise of current. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective with parts broken away and shown in section illustrating a bimetallic thermostatic strip prepared for application of a heater in accordance with this invention;

FIG. 2 is a view similar to FIG. 1 showing the completed strip with the heater;

FIG. 3 is a view in elevation showing the FIG. 2 element utilized in a thermostatic device;

FIG. 4 is a section showing a thermostatic device including a snap-acting thermostatic disk provided with a heater in accordance with this invention;

FIG. 5 is a view similar to FIG. 3 showing a modification;

FIG. 6 is a section similar to FIG. 4 showing the invention as applied to a snap-acting disk of the type shown in U.S. Patent 3,002,386; and FIG. 7 is a section similar to FIG. 4 showing a modification.

Corresponding reference characters indicate corresponding parts throughout the several views of the drawings.

Referring first to FIG. 1 of the drawings, there is indicated at 7 a bimetallic thermostatic element body, comprising a strip composed of two layers 3 and 5 of metals having different thermal coefficients of expansion. The term "metals" is herein used in its broad sense including alloys. The strip 1 is shown as provided on one surface (on the face of layer 5, as illustrated) with a layer of electrical insulating material 7. This layer 7 consists, for example, of a film of a ceramic material thinner than the bimetallic strip bonded to the bimetallic strip. Also as shown in FIG. 1, a pair of electrically conductive heater terminal spots 9 are bonded to the layer 7. After these terminal spots (which may be referred to as terminals or contacts) have been applied to layer 7, a thin metallic film 11 is applied and bonded to the layer 7, overlapping the terminals 9. This film 11 is thinner than the bimetallic strip and is adapted to serve as a high electrical resistance heater for thermostatic element 1 by passing current therethrough, utilizing terminals 9 for connection of electrical conductors.

FIG. 3 illustrates how the strip shown in FIG. 2 is utilized in a simple thermostatic device. One end of the strip is secured to a terminal post 13. A contact 15 is provided at the other end of the strip on layer 3. Contact 15 is engageable with a contact 17 on a terminal post 19. Electrical conductors 21 and 23 are connected to posts 13 and 19. Electrical conductors 25 and 27 (pigtails) are connected to terminals 9 on the strip, which provide for soldering of conductors thereto. Current supplied via conductors 25 and 27 flows through film 11, and the latter is heated thereby to heat strip 1. The latter carries current between the posts as long as contact 15 engages contact 17, and, in response to sufficient temperature, flexes to carry contact 15 away from contact 17 to break the 21, 23 circuit. Film 11 and layer 7 are thin and accordingly of low thermal mass. Consequently, a high proportion of the heat generated by film 11 is transferred to the strip 1, thereby obtaining a very high rate of rise of temperature of strip 1 for a given rate of rise of current flowing through the film 11. The latter, being very thin, has a high electrical resistance characteristic.

As to layer 7, this may consist, for example, of a ceramic (vitreous enamel) coating fused on the surface of strip 1. In general, any suitable ceramic, such as aluminum fluoride or one of those specified in the above-mentioned U.S. Patent 3,002,386 may be used. For example, a layer of aluminum fluoride in particulate or powdered form is roll bonded to a bimetallic strip, and then sintered. In the bonded composite, the bimetal is about 0.010 inch thick and the aluminum fluoride layer is on the order of 0.001 inch thick. Then a thin metallic film for example on the order of 100 angstroms in thickness is deposited on the aluminum fluoride.

Layer 7 may also be applied by bonding a thin film of aluminum to strip 1, then converting the aluminum film to an aluminum oxide ($Al_2O_3$). Conversion may be effected by the well-known anodizing process. For example, a layer of aluminum approximately 0.0005 to 0.001 inch thick is bonded to a bimetal approximately 0.010 inch thick. About half the aluminum layer is then anodized, the resultant composite material then consisting of a bimetal layer about 0.010 inch thick, an aluminum layer about 0.00025 to 0.0005 inch thick, and an aluminum oxide layer about 0.00025 to 0.0005 inch. Then a metallic film of the order of 100 angstroms in thickness is deposited on the aluminum oxide layer. Preferably, the anodizing process is one referred to as "hard anodizing," carried out at higher current densities and at lower temperatures than the customary anodizing processes.

Layer 7 may also be provided by forming one of the layers of strip 1 (e.g. layer 5) of aluminum and then anodizing the aluminum layer 5 in the manner described above to provide a thin adherent electrically insulating layer 7, which predictably has a thickness which is small enough so as not to significantly interfere with thermal activity of the thermally responsive strip 1.

As to film 11, this may be provided, for example, by holding the strip 1 (already having an electrically insulating e.g. a ceramic layer 7 thereon) at a temperature of about 400° C. and exposing layer 7 to vaporized hydrous stannous chloride ($SnCl_2 \cdot 2H_2O$). This results in the deposition on layer 7 of a high resistance film 11, the resistance depending on the thickness of the film, the thickness being dependent on the exposure time. Or the strip may be held at about 800° C. and an aqueous solution of stannic chloride pentahydrate ($SnCl_4 \cdot 5H_2O$) or indium trichloride ($InCl_3$) sprayed on layer 7. Such operations result in formation of a metallic high electrical resistance film on layer 7 adapted to serve as a heater. Film 11 may also be provided, for example, by vacuum evaporation of metals such as chromium, nickel, or a nickel-chrome alloy consisting of 15–16% chromium, 59–62% nickel, about 24% iron and 0.1% carbon onto layer 7. Or film 11 may be plated on layer 7 or applied as a thin foil bonded by a suitable adhesive to layer 7. Electroless nickel plating may be used, or a thin foil of metal such as the nickel-chrome alloy mentioned above may be adhered to layer 7. For example, an insulating layer of aluminum fluoride or aluminum oxide may be provided on a bimetal layer as described above. The thickness of the bimetal layer may, for example, range from 0.003 to 0.1 inch. The thickness of the insulating layer may, for example, range from 0.0001 to 0.003 inch. Then a foil, which may range in thickness from 0.0001 inch to 0.003 inch, is adhered to layer 7 with a conventional high temperature resistant adhesive, such as a phenolic modified epoxy adhesive.

Whatever the composition or mode of application of layer 7 may be, it is generally important that it be thin in relation to the bimetal, or conversely, that the bimetal be thick in relation to layer 7, so as to minimize the influence of the layer 7 on the thermal operation or activity of the bimetal. Generally, it is desirable to use as thin an insulating layer 7 as possible. The thickness of film 11 depends upon the electrical resistance characteristic desired, and usually this is such that film 11 is very thin, particularly when deposition techniques are used, thicknesses of 50 to 1000 angstroms then being typical.

Spots 9 are, as indicated, normally applied to layer 7 before application of film 11. They may be provided by applying a suitable silver paste, as by printing or brushing, to layer 7, then firing at a high temperature to effect a bond to layer 7 and to sinter the silver particles of the paste. Or spots 9 may be applied by depositing relatively thick applications of a suitable conductive metal (several thousand angstroms in thickness) utilizing vacuum evaporation techniques, or in any other suitable way, as, for example, by plating with an electroless nickel solution. Instead of spot 9, a strip or stripe of contact material extending substantially across the full width of the conducting path of layer 11 may be employed in some cases.

FIG. 4 illustrates a snap-acting thermostatic disk 31 composed of two layers 33 and 35 of metals having different thermal coefficients of expansion, provided with a layer 37 of electrical insulating material, terminal spots 39 and a metallic film 41, corresponding to layer 7, spots 9 and film 11 of the strip shown in FIGS. 2 and 3. Disk 31 is shown as having contacts 43 and as being used in conjunction with fixed contacts 45 connected in an electrical circuit as indicated at 46, with conductors 47 and 49 (pigtails) connected to terminal spots 39 for passing current through film 41.

FIG. 5 illustrates a modification of the FIG. 3 device, in which film 11 extends around and over the end of strip 1 where the strip is secured to post 13. The spot 9 at this end of the strip is omitted. This places strip 1 and film 11 in series, establishing a current path such as indicated by the arrows in FIG. 5 from conductor 23 through contacts 17 and 15, strip 1, film 11 to conductor 27.

FIG. 6 illustrates a snap-acting thermostatic disk 51 composed of a metal layer 53 and a ceramic layer 55 like the disk shown in FIG. 2 of U.S. Patent 3,002,386, with terminal spots 39 and a metallic film 41 corresponding to the spots 39 and film 41 shown in FIG. 4, with electrical connections the same as shown in FIG. 4. Here the ceramic layer 55 which constitutes one of the operating layers of the disk, as distinguished from layer 37 of the FIG. 4 disk which functions only as an insulating layer, is utilized as a base for film 41.

FIG. 7 illustrates a thermostatic device including a snap-acting thermostatic disk 31a carrying a film for heating purposes so constructed as to avoid any appreciable restraint to snapping of the disk. The disk 31a is similar to disk 31 shown in FIG. 4, having an insulating layer 37 and film 41. Disk 31a is provided at diametrically opposite sides adjacent its periphery with holes 61. Terminals 39a are provided as relatively thick annular rings around these holes. At 63 is indicated a pin extending from and engageable by the center of the disk for operating an associated device, which may be a switch or a valve, for example in response to movement of the disc. Fixed electrically conductive terminal posts are indicated at 65. These have reduced-diameter extensions 67 which extend through holes 61 in disk 31a. Extensions 67 have upper heads 69. These are spaced from shoulders 71 of posts 65 a distance such as to allow free snapping of the disk. Electrically conductive relatively weak coil compression springs 73 are provided on extensions 67 between heads 69 and the disk and react from the heads against the annular terminal rings 39a surrounding holes 61 in the disk. The arrangement is such that a current path is provided from one post through the respective spring 73, film 41, and the other spring to the other post. Springs 73 being weak, no appreciable restraint is imposed on the snapping of the disk.

While film 11 is illustrated as covering the entire area of one face of strip 1, and film 41 is illustrated as covering the entire area of one face of disk 31 (or disk 31a), it will be readily understood that the film may be applied in any desired pattern other than a full-area application. For example, it may be applied as a relatively narrow band following a tortuous course (a zigzag pattern) on the face of the strip or disk. This may be readily accomplished, for example, simply by using a suitable mask in the process of deposition of the metallic material to form the film. It is also contemplated that layers of insulating material (such as a ceramic) and metallic films may be applied to both faces of a thermostatic element to provide heaters on both faces. Where a film is applied to one face to provide a heater, it may be applied to either face. As shown in FIGS. 3–7, the film is on the low expansion face, but in some instances it may be preferable to apply it to the high expansion face of the thermostatic element to provide an anticipation effect, i.e., to increase the rate of response of the thermostatic element.

While bimetallic thermostatic elements are shown in FIGS. 1–5 and 7, and a thermostatic element consisting of a metal layer and a ceramic layer is shown in FIG. 6, it will be understood that the invention is not limited to two-layer thermostatic elements, being equally applicable to thermostatic elements composed of more than two layers. For example, insulating layer 7 may be applied to any type of thermostatic element body having more than two layers of materials of different thermal coefficients of expansion, and film 11 then applied to the insulating layer.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. A thermostatic device comprising a snap-acting thermostatic disk having a layer of electrical insulating material, an electrical resistance heater for said element comprising a film bonded to said layer, said disk, layer and film having holes therein, electrically conductive supports for said disk extending through said holes, and electrically conductive springs on said supports, one end of each spring being in contact with the respective support and the other end of each spring making electrical contact with said film.

2. A thermostatic device comprising a composite thermally responsive element having a layer of electrically insulating material; an electrical resistance heater for said element comprising a film adhered to said layer; said element, said layer and film being provided with at least one aperture therein; an electrically conductive support for said element extending through said aperture and an electrically conductive spring member interposed between said support and said element; one end of said spring member being resiliently maintained in electrically conductive relationship with respect to said support and the other end of said spring member being resiliently maintained in electrically conductive relationship with said film.

3. A thermostatic element comprising a plurality of layers of materials of different thermal coefficients of expansion, and including at least one flexible layer of meallic material and an outside flexible layer of a ceramic material, said ceramic layer being relatively thin in relation to the overall thickness of said element and of low thermal mass, and an electrical resistance heater incorporated as a part of said element comprising a film of metallic material bonded on the outside face of said ceramic layer, said layers and said film being adapted to flex as a unit.

4. A thermostatic element as set forth in claim 3 which comprises a body constituted by bonded-together layers of metals of different thermal coefficients of expansion, said ceramic layer being on the outside face of one of said metal layers.

5. A snap-acting thermostatic element comprising a body constituted by bonded-together layers of materials of different thermal coefficients of expansion and formed so as to snap from one configuration to another in response to temperature change, a flexible layer of ceramic material on the outside of one face of said body, said ceramic layer being relatively thin in relation to the thickness of said body and of low thermal mass, and an electrical resistance heater incorporated as a part of said element comprising a film of metallic material bonded on the outside face of said ceramic layer, said ceramic layer and said film being adapted to snap with said body as a unit.

6. A snap-acting thermostatic element as set forth in claim 5 wherein said film extends around an edge of said body to provide for series connection of said body and film.

7. A snap-acting thermostatic element as set forth in claim 5 wherein said ceramic layer is a layer of aluminum fluoride.

8. A snap-acting thermostatic element as set forth in claim 5 wherein one layer of said body is a layer of aluminum and said ceramic layer is constituted by an anodized surface portion of said aluminum layer.

References Cited by the Examiner

UNITED STATES PATENTS

| 2,347,014 | 4/44 | Willmann | 60—23 |
| 2,773,239 | 12/56 | Parker | 174—68.5 X |
| 2,800,555 | 7/57 | Sundt | 200—122.03 |
| 2,920,165 | 1/60 | Dittman | 200—122 |
| 3,028,447 | 4/62 | Flaschen et al. | 174—113 |

FOREIGN PATENTS 663,355   1/36   Germany.

JULIUS E. WEST, *Primary Examiner.*

ISAAC LISANN, EDGAR W. GEOGHEGAN,
*Examiners.*